O. W. JUDD.
LIQUID EXTRACTOR.
APPLICATION FILED OCT. 7, 1920.
1,400,957.
Patented Dec. 20, 1921.
2 SHEETS—SHEET 2.
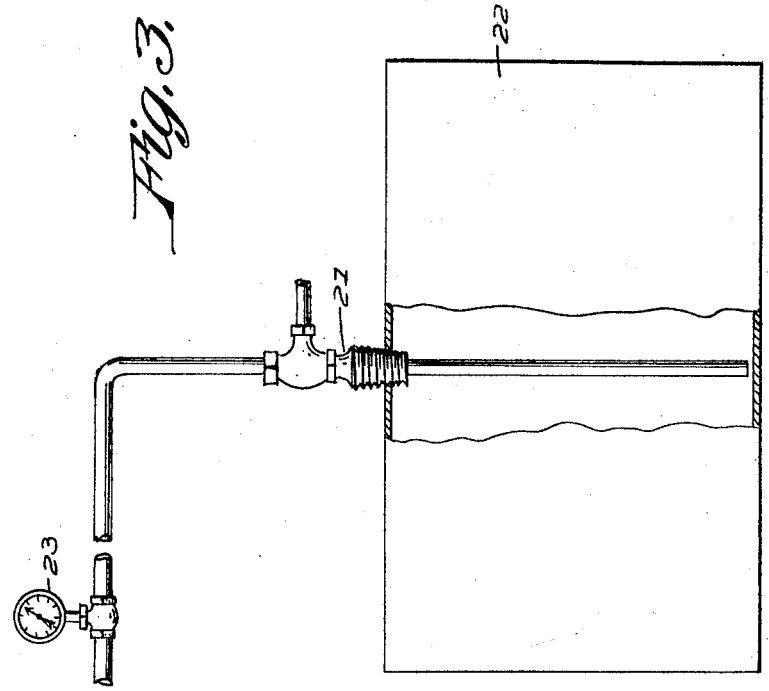
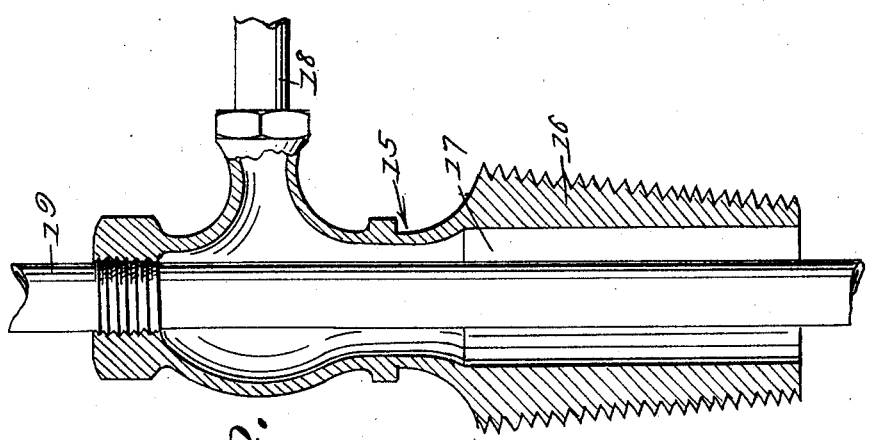

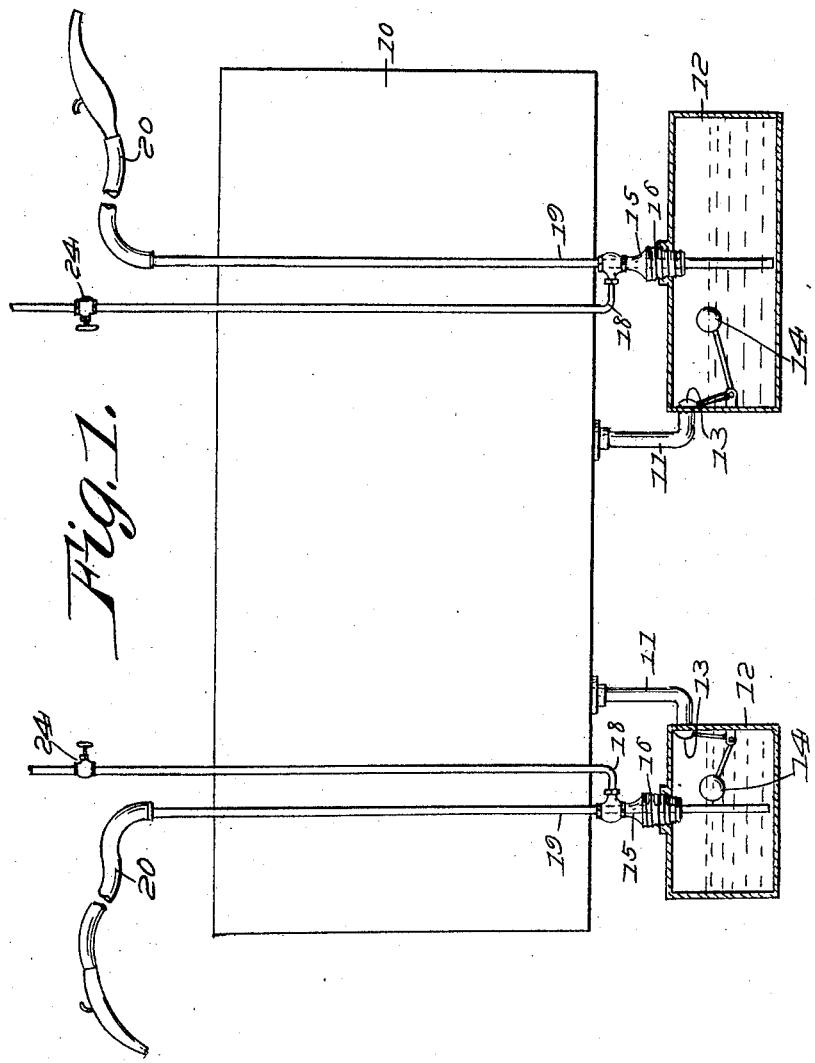

UNITED STATES PATENT OFFICE.

ORION W. JUDD, OF PADUCAH, KENTUCKY.

LIQUID-EXTRACTOR.

1,400,957.  Specification of Letters Patent.  Patented Dec. 20, 1921.

Application filed October 7, 1920. Serial No. 415,313.

*To all whom it may concern:*

Be it known that I, ORION W. JUDD, a citizen of the United States of America, residing at Paducah, in the county of McCracken and State of Kentucky, have invented new and useful Improvements in Liquid-Extractors, of which the following is a specification.

The object of the invention is to provide simple, relatively inexpensive and efficient means for transferring liquid such as fuel oil and particularly a liquid of an expensive or highly inflammable quality from a storage reservoir or tank to the portable reservoir or tank of an automobile, locomotive or like vehicle of the motor driven type, under such conditions as to avoid the exposure of the liquid and measure the quantity of liquid transferred, and also under such conditions as to provide for effecting the transfer from a storage reservoir which, for example, is located for safety at a distance from the point of delivery and in a subterranean vault; and with these objects in view the invention consists in the construction and combination of parts of which a preferred embodiment is shown in the accompanying drawing, wherein:—

Figure 1 is an elevation partly in section of an apparatus constructed in accordance with the invention.

Fig. 2 is a detail enlarged section of the connection or coupling for the air-line discharge pipes.

Fig. 3 is a view of a modified form of the apparatus in which a gage is employed in connection with the delivery pipe.

In the form of the invention illustrated in Fig. 1 the main storage tank 10 which is supposed to be located in a suitable protected position as for example below the surface of the soil is connected by feed tubes 11 with measuring tanks 12 which may be of different capacities as shown as for example five gallons and ten gallons respectively, the inlet into said measuring tanks being controlled by valves 13 actuated by floats 14, said valves opening inwardly toward the measuring tanks so as to be held seated by pneumatic pressure within the tanks. The coupling 15 which is shown in detail in Fig. 2 is provided with a threaded plug 16 adapted to be threaded into a suitable seat or opening in the wall of the measuring tank and is provided with an air passage 17 in communication with which is arranged an air-line 18 designed to apply pneumatic pressure from a suitable source (not shown) such as a compressor, pump or railroad train pipe, to the surface of the liquid contents of the measuring tank. Extending axially through the air passage 17 of the coupling is a delivery tube 19 designed to extend as indicated in Fig. 1 to a point near the bottom of the tank and adapted to be carried to any preferred point of delivery by means of an attached flexible hose 20 for discharge into the tank or reservoir of the vehicle to be supplied.

In the construction illustrated in Fig. 3 the coupling including the air-line and delivery connections, and shown generally at 21 is attached directly to the storage tank 22, and the measuring of the liquid discharged from the tank is measured by means of a gage 23 of any suitable type.

In practice, as will be obvious, the opening of the valve 24 by which air pressure is admitted from the air-line to the tank will cause the discharge of the liquid contents of the latter through the delivery pipe, the valve 13 meanwhile being held closed by the pressure, and after the liquid contents have been discharged the relief of pressure within the tank will permit the opening of the valve 13 and the refilling of the measuring tank from the storage tank 10, to the end that successive measurements of the liquid may be discharged and suitably tallied by the operator. In the construction illustrated in Fig. 3 the registration of the amount of liquid discharged will be indicated by the gage, the operation of the mechanism in other respects being as above described.

Having described the invention, what I claim as new and useful is:—

1. A liquid fuel supply apparatus for vehicles having a storage tank, a measuring tank of a definite capacity connected with the storage tank by a supply pipe, a float controlled valve for the supply pipe opening inwardly with reference to the measuring tank, a coupling having a bore in communication with the measuring tank at its top and provided with a lateral airline connection, and a delivery tube extending axially through the bore of the coupling to a point near the plane of the bottom of the measuring tank.

2. A liquid supply for vehicles having a storage tank, a measuring tank of a definite capacity connected with the storage tank by a supply pipe, a valve controlling communication between the supply pipe and the measuring tank and having means whereby it is adapted for operation by either pneumatic or hydraulic pressure, a valve controlled air pressure pipe in communication with the measuring tank, and a delivery tube for the latter.

In testimony whereof he affixes his signature.

ORION W. JUDD.